(12) United States Patent
Crocker et al.

(10) Patent No.: US 11,604,028 B2
(45) Date of Patent: Mar. 14, 2023

(54) THERMOPLASTIC EXTRUSION MELTING KETTLE (71) Applicant: Waterblasting, LLC, Stuart, FL (US)

(72) Inventors: James P. Crocker, Stuart, FL (US); Caleb Carroll, Stuart, FL (US)

(73) Assignee: WATERBLASTING, LLC, Stuart, FL (US)

( * ) Notice: Subject to any disclaimer, the term of this patent is extended or adjusted under 35 U.S.C. 154(b) by 253 days.

(21) Appl. No.: 17/078,737

(22) Filed: Oct. 23, 2020

(65) Prior Publication Data

US 2021/0123677 A1    Apr. 29, 2021

Related U.S. Application Data (60) Provisional application No. 62/944,788, filed on Dec. 6, 2019, provisional application No. 62/925,628, filed on Oct. 24, 2019.

(51) Int. Cl.
*F27B 14/14* (2006.01)
*B29B 7/12* (2006.01)
(Continued)

(52) U.S. Cl.
CPC ............ *F27B 14/14* (2013.01); *B01F 27/112* (2022.01); *B01F 27/191* (2022.01);
(Continued)

(58) Field of Classification Search
CPC .. B01F 15/065; B01F 7/18; B01F 7/20; B01F 7/0025; B01F 7/00258; B01F 7/00075; B01F 7/00041; B01F 7/165; B01F 7/00275; B01F 2215/0422; B01F 27/112; B01F 27/191; B01F 27/192; B01F 27/96; E01C 19/08; E01C 23/20; E01C 23/206; C10C 3/12; B28C 5/12; B28C 5/16; F27B 14/14; F27B 14/20; F27B 2014/0843; F27B 2014/0881; F27B 2014/0887; B29B 7/12; B29B 7/82; B29B 13/022; E01F 9/518
(Continued)

(56) References Cited

U.S. PATENT DOCUMENTS 2,706,111 A * 4/1955 Kniveton ................ F27B 14/00
                                                         266/166
4,082,587 A    4/1978 Eigenmann
(Continued)

FOREIGN PATENT DOCUMENTS

CH          509470     6/1971
CN        107938468    4/2018
(Continued)

*Primary Examiner* — Charles Cooley
(74) *Attorney, Agent, or Firm* — McHale & Slavin, P.A.

(57) ABSTRACT

A melting kettle for processing of thermoplastic material. The kettle disclosed herein obtains heat transfer by use of an oil jacketed tank with an adjoining main tank for storage of hot oil and a hose tank for recovery of the hot oil. Oil expelled from the oil jacket is directed to the main tank through an opening. Spillage of oil from the hose tank is directed to the main tank through an aperture. The melting kettle reduces the space needed for oil storage, and increases operator safety by eliminating additional transfer lines. Dual kettles benefit by having the adjoining main tank placed therebetween.

9 Claims, 10 Drawing Sheets

(51) Int. Cl.
*B29B 7/82* (2006.01)
*B29B 13/02* (2006.01)
*F27B 14/20* (2006.01)
*B01F 27/96* (2022.01)
*B01F 27/112* (2022.01)
*B01F 27/191* (2022.01)
*B01F 27/192* (2022.01)
*F27B 14/08* (2006.01)
*E01F 9/518* (2016.01)
*E01C 23/20* (2006.01)

(52) U.S. Cl.
CPC ............ *B01F 27/192* (2022.01); *B01F 27/96* (2022.01); *B29B 7/12* (2013.01); *B29B 7/82* (2013.01); *B29B 13/022* (2013.01); *F27B 14/20* (2013.01); *E01C 23/20* (2013.01); *E01F 9/518* (2016.02); *F27B 2014/0843* (2013.01); *F27B 2014/0881* (2013.01); *F27B 2014/0887* (2013.01)

(58) Field of Classification Search
USPC ...... 366/144–149; 404/92, 95, 113, 115, 116
See application file for complete search history.

(56) References Cited

U.S. PATENT DOCUMENTS

| | | | | |
|---|---|---|---|---|
| 4,506,982 A * | 3/1985 | Smithers | ............... | B01F 33/502 366/65 |
| 4,692,028 A * | 9/1987 | Schave | ............... | E01C 23/0973 366/601 |
| 4,887,908 A * | 12/1989 | Montgomery | .......... | E01C 19/45 366/4 |
| 5,785,760 A | 7/1998 | Sconyers | | |
| 6,012,447 A * | 1/2000 | Waxier | .................. | B29B 13/022 68/132 |
| 6,012,870 A * | 1/2000 | Dillingham | ............ | E01C 19/08 404/101 |
| 6,109,826 A * | 8/2000 | Mertes | ..................... | E01C 19/45 404/95 |
| 8,992,120 B2 * | 3/2015 | Fredrickson | ............ | E01C 23/16 404/95 |
| 9,132,570 B2 * | 9/2015 | Trimborn | ................ | E01C 19/08 |
| 9,732,280 B1 * | 8/2017 | Hollar | ..................... | B01F 23/47 |
| 10,126,054 B1 * | 11/2018 | Shea | ....................... | F27B 14/14 |
| 10,126,057 B2 * | 11/2018 | Shea | ........................ | F27D 3/06 |
| 11,192,130 B2 * | 12/2021 | Crocker | ................. | E01C 23/22 |
| 2003/0062427 A1 * | 4/2003 | Bien | ..................... | E04D 15/07 239/128 |
| 2013/0294187 A1 | 11/2013 | Trimborn | | |
| 2018/0031320 A1 * | 2/2018 | Shea | ........................ | F27B 9/145 |
| 2018/0230658 A1 * | 8/2018 | Wilkens | ................ | B05B 9/002 |
| 2019/0063013 A1 * | 2/2019 | Shea | ........................ | F27B 14/14 |
| 2021/0123677 A1 * | 4/2021 | Crocker | ................ | B29B 13/022 |
| 2021/0123678 A1 * | 4/2021 | Crocker | ................ | B01F 27/96 |
| 2021/0170434 A1 * | 6/2021 | Crocker | ................ | G01F 23/292 |

FOREIGN PATENT DOCUMENTS

| | | | | |
|---|---|---|---|---|
| GB | 741503 | | 12/1955 | |
| GB | 2305996 A | * | 4/1997 | ........... B29B 13/022 |
| KR | 20100037423 | | 4/2010 | |
| KR | 20180049779 | | 5/2018 | |
| WO | WO-8200193 A1 | * | 1/1982 | |
| WO | WO-2007035982 A1 | * | 4/2007 | ........... B01F 15/065 |
| WO | WO-2021081343 A1 | * | 4/2021 | ........... B01F 7/0025 |
| WO | WO-2021081344 A1 | * | 4/2021 | ........... B01F 7/0025 |

* cited by examiner

THERMOPLASTIC EXTRUSION MELTING KETTLE

FEDERALLY SPONSORED RESEARCH OR DEVELOPMENT

Not Applicable

CROSS REFERENCE TO RELATED APPLICATION

In accordance with 37 C.F.R. 1.76, a claim of priority is included in an Application Data Sheet filed concurrently herewith. Accordingly, the present invention claims priority to U.S. Provisional Patent Application No. 62/925,628, filed Oct. 24, 2019, entitled "Thermoplastic Extrusion Truck" and U.S. Provisional Patent Application No. 62/944,788 filed Dec. 6, 2019, entitled "Improved Thermoplastic Extrusion Markings"; the contents of which are incorporated herein by reference.

FIELD OF THE INVENTION

This invention is directed to the field of roadway marking equipment and, in particular, to a dual thermoplastic melter for applying thermoplastic extrusions, sealant and the like.

BACKGROUND OF THE INVENTION

Extrusion vehicles are used to melt and deliver molten material to a roadway. For purposes of discussion, the molten material referred to herein will be primarily thermoplastics, but it will be obvious to one skilled the art that the extrusion vehicles can also be used for applying bitumen, crack sealant and the like. The traditional method involves direct fire applied to kettles holding thermoplastic materials which are transposed into a molten state and delivered to the roadway to produce a variety of roadway line sizes and profiles. The thermoplastic material is melted over the course of hours and, once the kettles are fully heated, operators apply the material to the roadway as long as material remains liquefied in the pots. Conventional pots typically hold enough material for only an hour or two of application time. If additional material is added, the new material takes time to liquefy and come up to temperature. During this time, the material in the kettle must endure a recovery time from the injection of unheated material. Under the conventional method, when the melted material in the kettle has been used, the crew must wait hours before another kettle is ready for application. Recovery time is an industry term pertaining to the amount of time it takes to melt another batch of thermoplastic material and reach a target temperature of about 400° F.

The thermoplastic material that is liquefied in a melting kettle is originally in powder form. The mix contains about 40% glass beads for reflectivity and a blend of about 60% plastic elements. There is an operable temperature, and a temperature at which the application of a thermoplastic strip is not at all workable. Many states require the temperature to be between 400° F. and 425° F. in order for the work to be acceptable. If the material is too hot, the thermoplastic will adhere to the road, but the glass beads within the applied material will sink into the applied material, rendering the material inadequate for nighttime reflectivity motoring conditions. If the applied material is too cold, the glass beads will not penetrate the applied material and the material itself is less likely to adhere to the roadway. For these reasons alone, temperature control and recovery time are critical to thermoplastic material implementation and glass bead retention.

In yet another embodiment, a melting kettle can be designed to receive bags of powered material on a continuous basis. When each bag of powdered material enters the melting kettle, it is met with molten material that is already at temperature and being delivered by a pump designed for liquefied thermoplastic material. The pump allows molten material to flow over the top of the incoming powder to reduce recovery time, as the powder will not flow through heat exchanger tubes unless the material has been converted from powder form into a liquefied state. However, in such an embodiment it is possible to outpace the top section of the melting kettle. For instance, a melt rate of 8,000 pounds per hour, per color, may consist of a truck having a white melting kettle and a yellow melting kettle. If a crew tries to melt 16,000 total pounds per hour, it likely that the burner used for heating oil employing a conventional heat exchanger process will have a long recovery time.

Conventional systems employ a burner for heating of oil. The hot oil is then passed through oil jackets that surround one or more thermoplastic melting kettles. The oil is then recirculated back to a hot oil storage tank, wherein the oil is available for reheating by the burner. While such a process is efficient, losses of heat do occur during the oil transfer and storage. Further, transfer of oil requires hoses and fittings, all of which are susceptible to damage and leaking.

What is lacking in the industry is a thermoplastic system that increases heating efficiency by positioning two melting kettles and a hot oil storage tank in a position to share a common wall, thereby eliminating the need for a number of transfer hot oil lines, thereby increasing the operational safety.

SUMMARY OF THE INVENTION

Disclosed is a melting kettle that may also be used on extrusion vehicles to allow continuous processing of material used for applying lines and stripes to a roadway. Embodiments include hot oil jacketed kettles, with a hot oil tank incorporated with the kettles, eliminating numerous transfer lines.

An objective of the invention is to provide a melting kettle with an integrated hot oil tank, wherein said system reduces space requirements, reduces the amount of oil transfer lines, and provides an increase in operator safety.

Still another objective of the invention is to provide dual melting kettles that are spaced apart by an air gap to allow independent operation or combined operations.

Yet still another objective of the invention is to teach the use of an opening between the oil jackets around each kettle and a main oil tank, eliminating the need for transfer lines.

Still another objective of the invention is to teach the use of a hose tank placed adjacent to the main oil tank for shielding connectors from operators, the host tank including an overflow aperture wherein excess hot oil is directed back to the main oil tank.

Other objectives and advantages of this invention will become apparent from the following description taken in conjunction with any accompanying drawings wherein are set forth, by way of illustration and example, certain embodiments of this invention. Any drawings contained herein constitute a part of this specification, include exem-

DETAILED DESCRIPTION OF THE INVENTION

Figure 1:
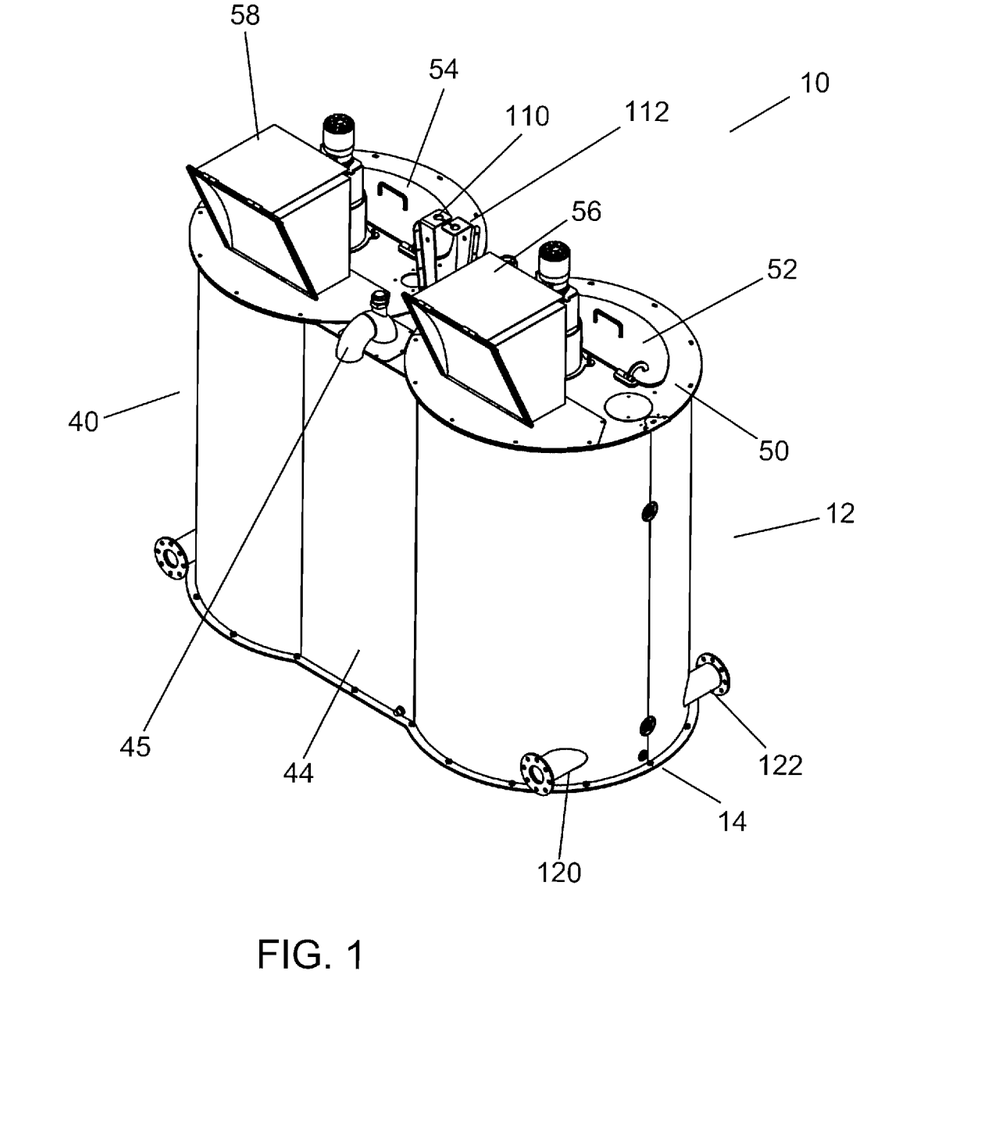
FIG. 1 is a perspective view of the dual melter of the instant invention.
Figure 2:
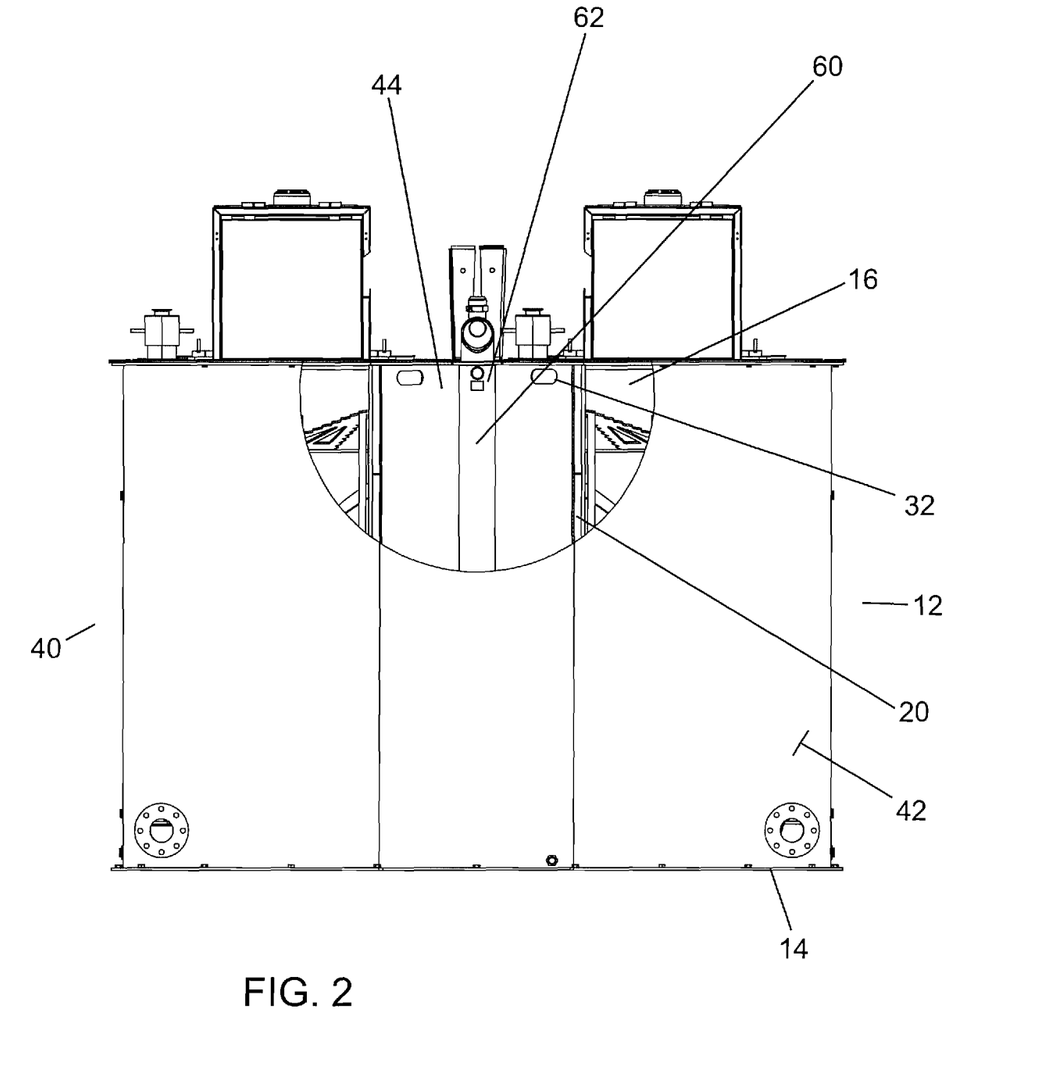
FIG. 2 is a perspective view of the dual melter with a partial cross-sectional of the main tank.
Figure 3:
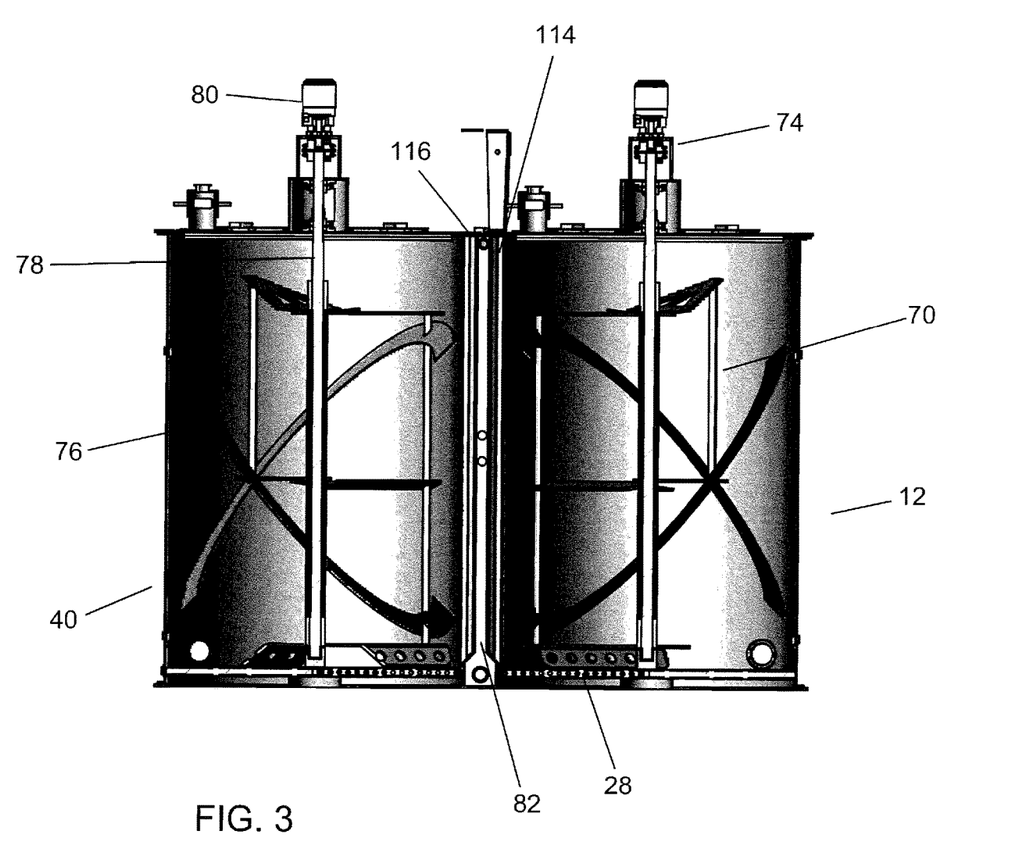
FIG. 3 is a front cross-sectional view thereof.
Figure 4:
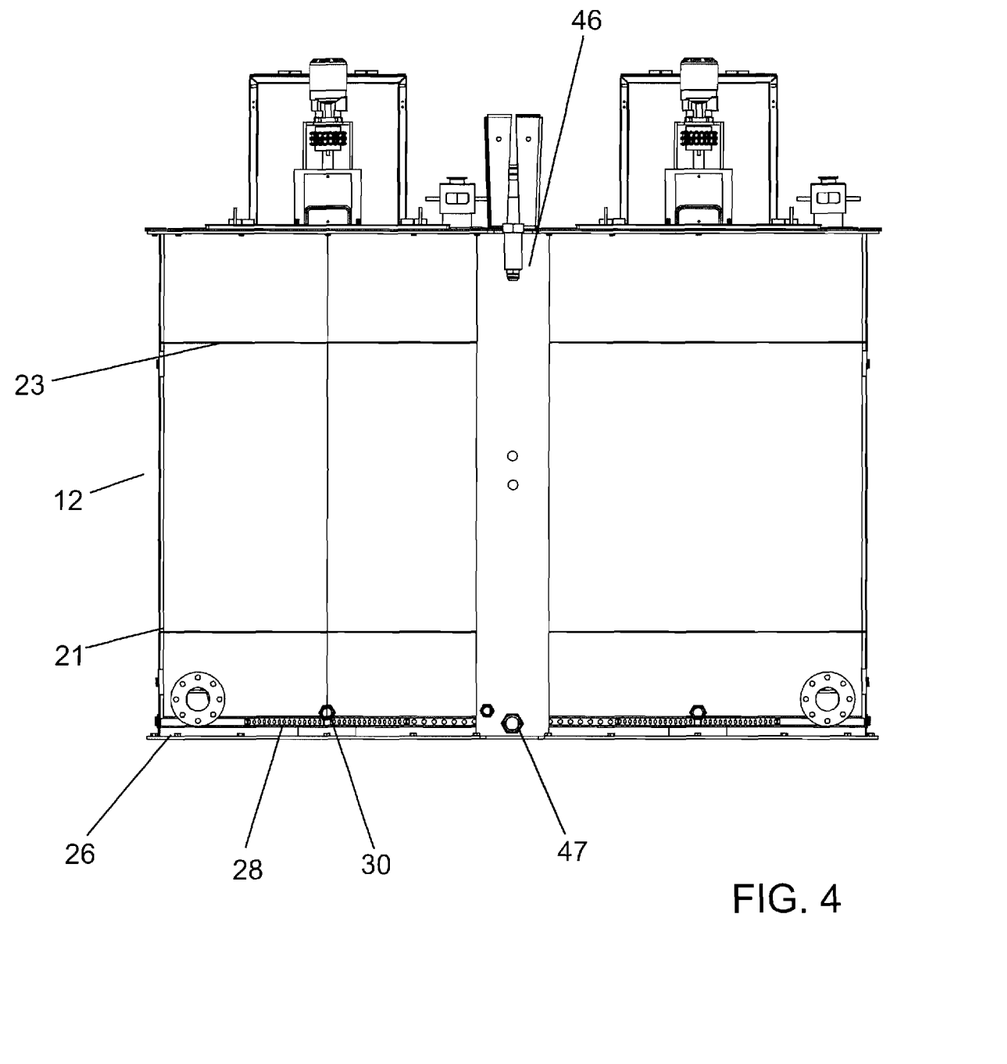
FIG. 4 is a rear view thereof.
Figure 5:
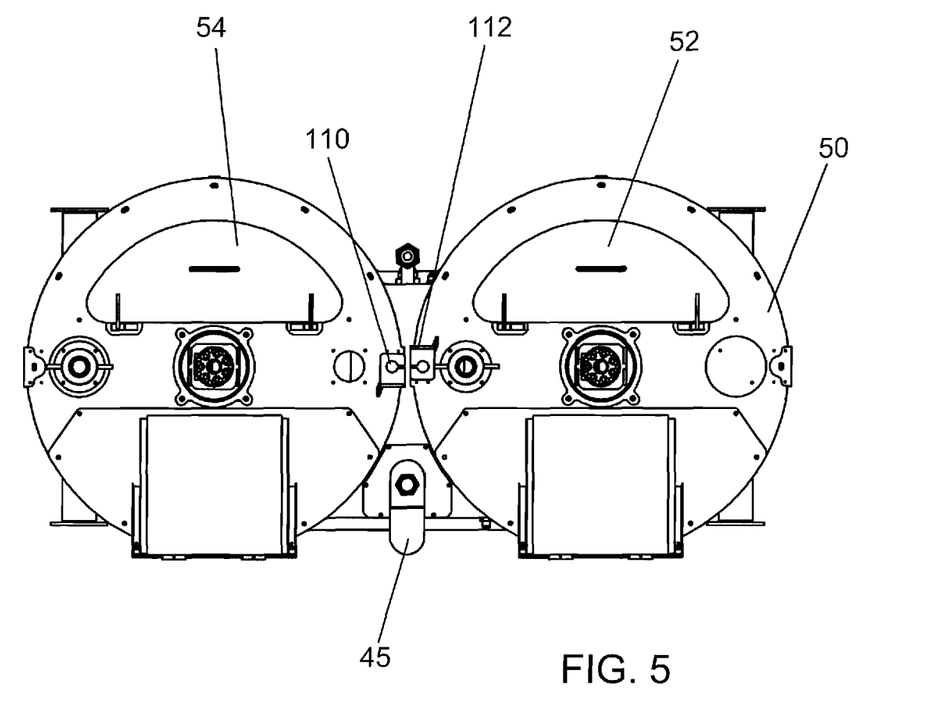
FIG. 5 is a top plane view thereof.
Figure 6:
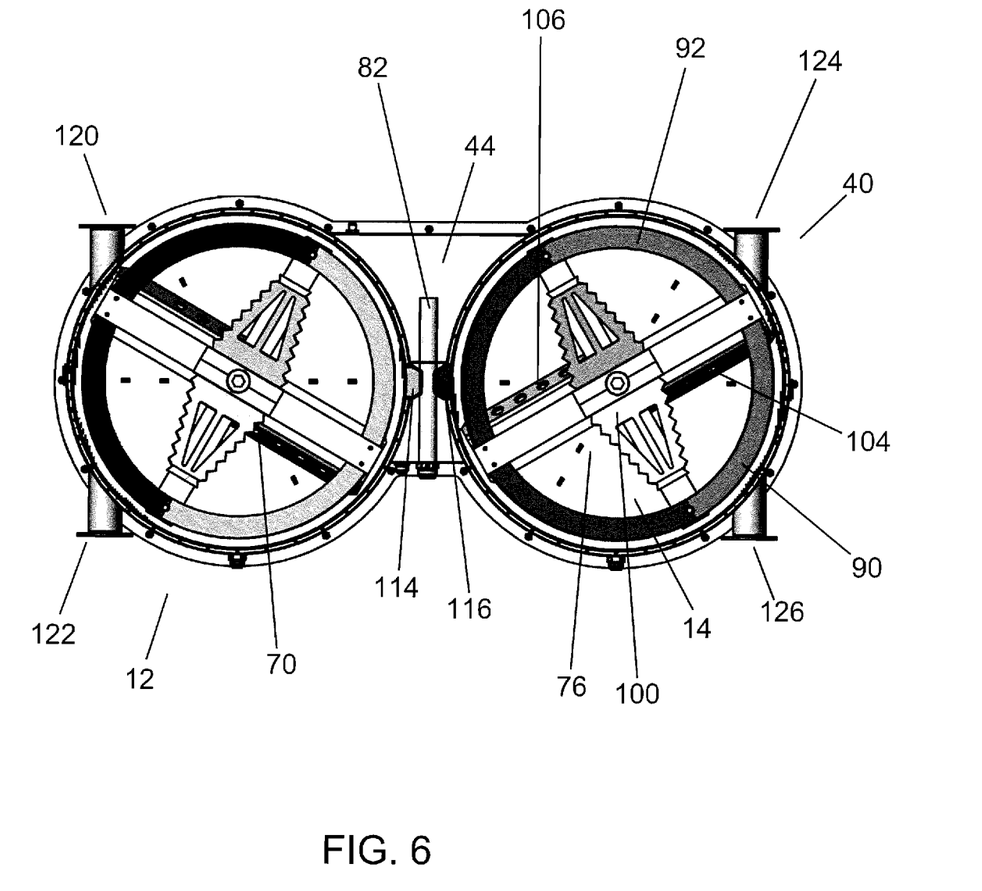
FIG. 6 is a top cross-sectional view.
Figure 7:
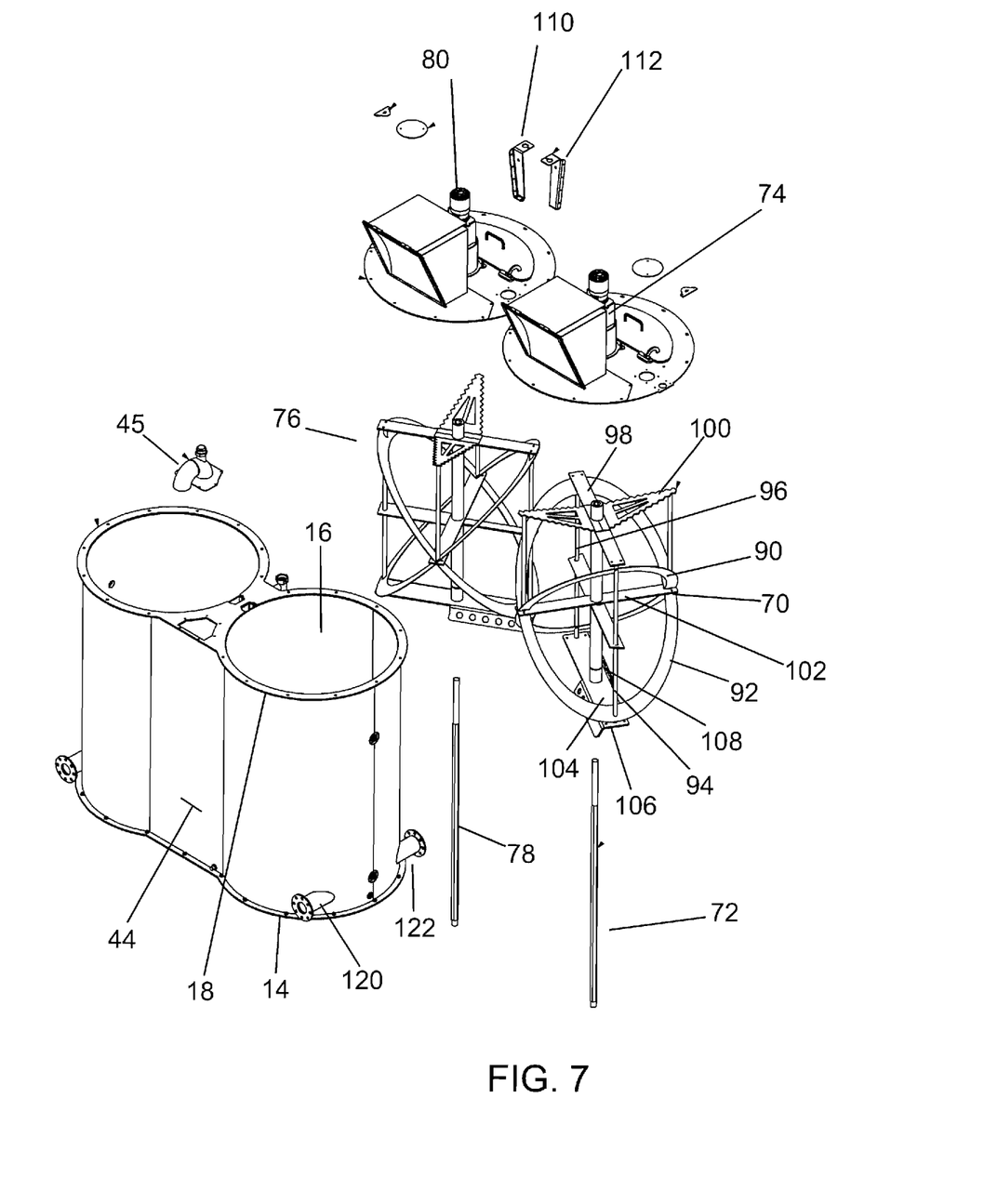
FIG. 7 is an exploded view.
Figure 8:
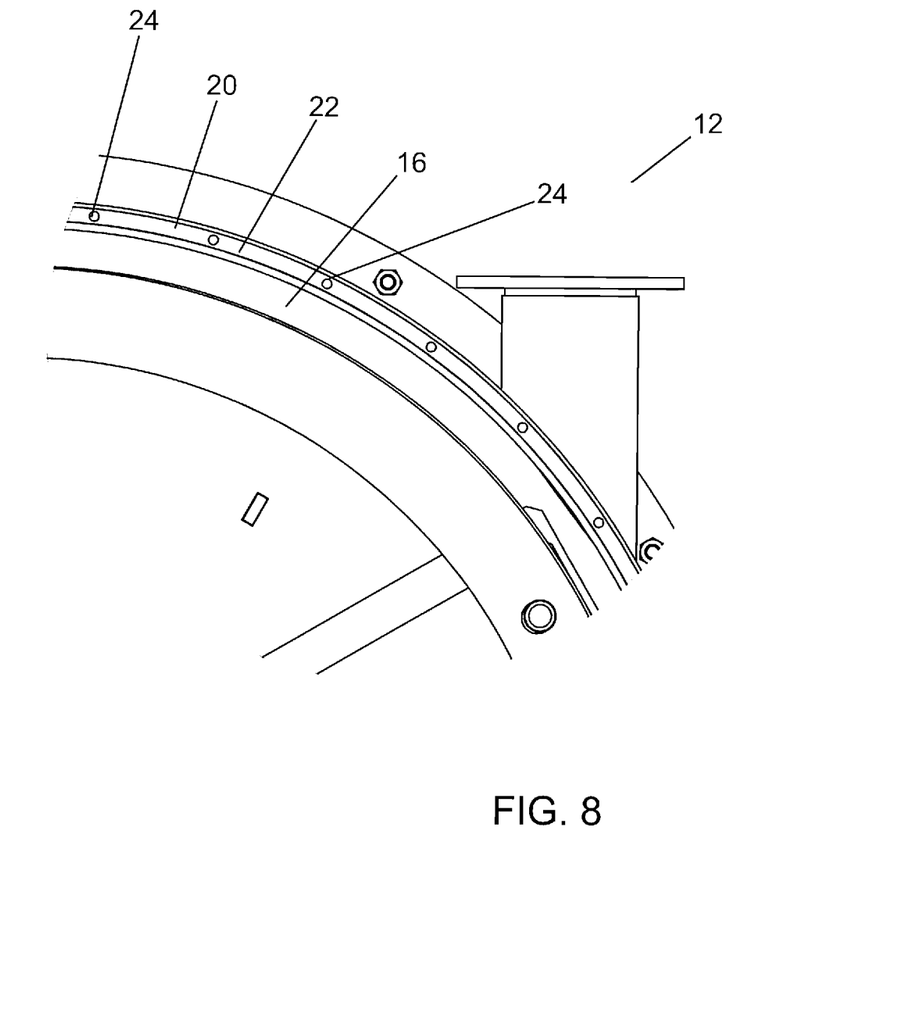
FIG. 8 is an enlarged view depicting an oil jacket.
Figure 9:
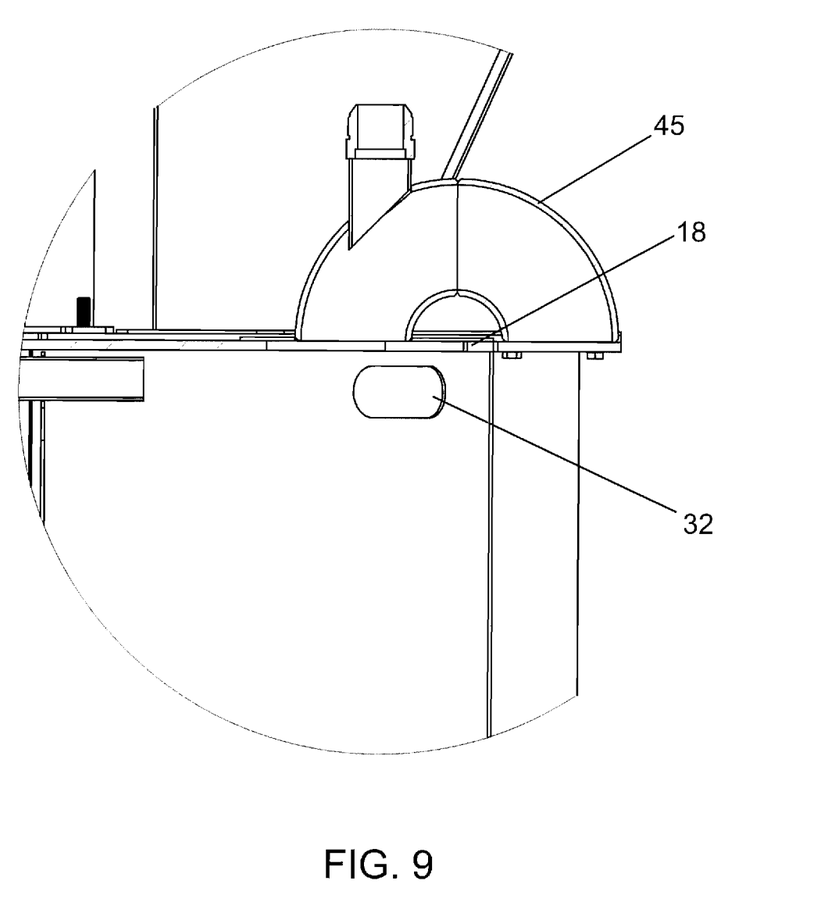
FIG. 9 is an enlarged view of an oil jacket spillway.
Figure 10:
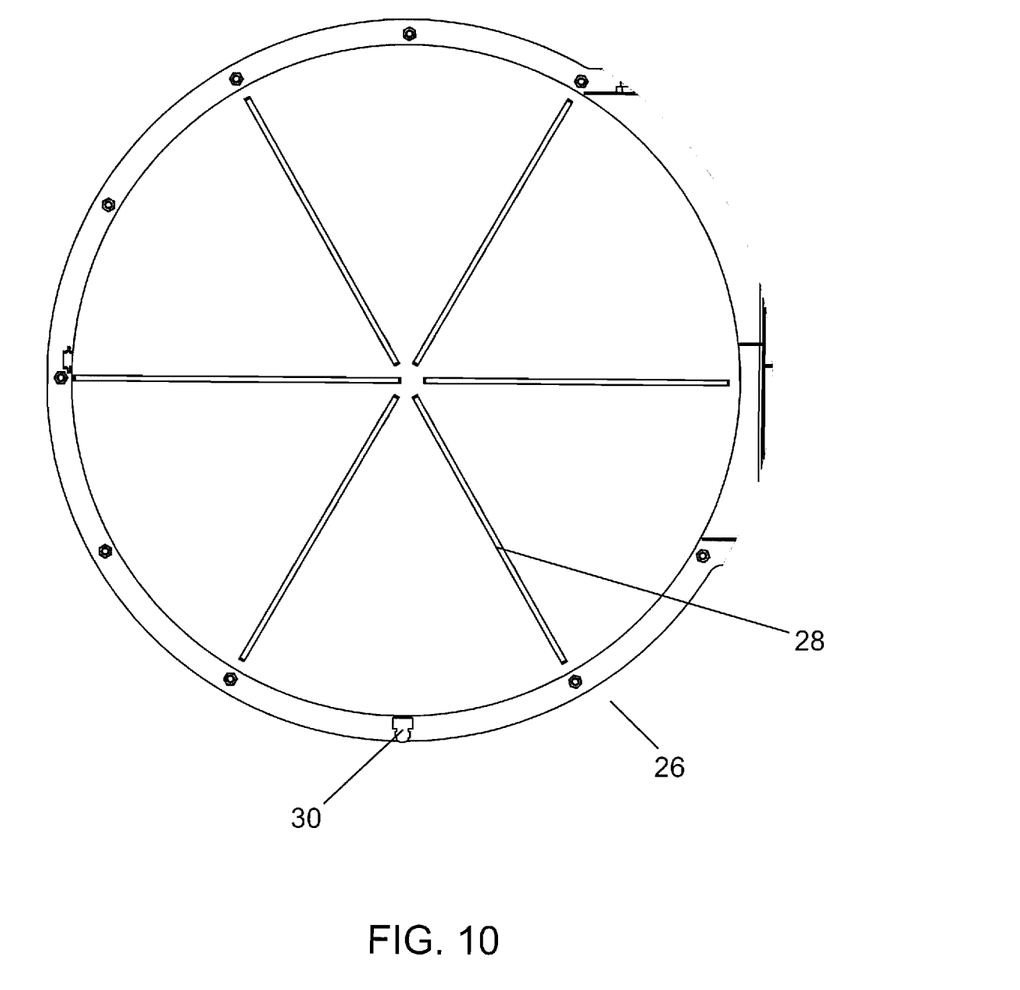
FIG. 10 is a plane to view of the tank base.

Detailed embodiments of the instant invention are disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Referring to the figures in general, illustrated is a dual melting kettle with hot oil storage system 10 comprising a first cylindrical shaped kettle 12 having a cylindrical bottom 14 with a first continuous sidewall 16 extending upwardly therefrom to a top 18. While a dual melting kettle is described herein, a single melting kettle will be obvious to those skilled in the art and considered within the scope of this invention. The sidewall 16 is encompassed by a first oil jacket 20 formed adjacent thereto, which is constructed and arranged to disperse hot oil around the sidewall 16. The first oil jacket 20 having a baffle 22 with a plurality of holes 24 for even dispersion of hot oil around the circumference of the first sidewall 16. The first kettle 12 has a base 26 positioned beneath the cylindrical bottom 14 incorporating baffles 28 to direct the circulation of hot oil for heating the bottom 14 of the kettle 12. Hot oil is introduced through an inlet 30 of the base 26 and passed through the first oil jacket 20 for expulsion through an opening 32 located beneath the top 18 of the kettle 12, the opening 32 directing hot oil that has passed through the oil jacket 20 to flow into a main tank 44. A second cylindrical shaped kettle 40 is placed adjacent to the first kettle 12, forming a mirror image thereof. For ease of drawing clarity, it is to be understood that oil jackets, bases and baffles are the mirror image as those listed with the first kettle 12, and the numbering of a drawing would be redundant.

An outer wall 42 placed around and adjoining the oil jacketed kettles 12 and 40 forms a main tank 44 for storage of hot oil in the front of the kettles 12, 40 and a hose tank 46 for housing hot oil hoses and connectors at the rear of the kettles. The main oil tank 44 has a suction line 47 along the bottom of the tank and an overflow pipe 45 at the top of the tank.

Hot oil is directed to the inlet 30 of the base 26 positioned beneath the bottom 14 of the kettle 12 by a hot oil pump, not shown. The hot oil is circulated through the base 26 using baffles 28 for flow distribution before the hot oil is directed into the oil jacket 20 having baffles 22 positioned between a lower section 21 and an upper section 23 for distribution of the hot oil using strategically positioned holes 24 to allow an even flow of hot oil. The hot oil exits the oil jacket 20 through an opening 32 located beneath the top 18 of the kettle 12 into the hot oil main tank 44. The opening 32 replaces the need for use of a transfer line commonly used to return oil exiting an oil jacket to a storage tank. A separating wall 60 placed between the kettles 12, 40 forms the hose tank 46. The hose tank 46 provides a further margin of safety should a hose or fitting leak inside the hose tank 46, the hose tank having an aperture 62 placed near the top of the separating wall 60, allowing excess oil to flow into the main tank 44.

The kettle 12 includes a mixing blade 70 that is coupled to a shaft 72 driven by an electric motor 74. Similarly, kettle 40 includes a mixing blade 76 that is coupled to a shaft 78 driven by an electric motor 80. The mixing blades 70, 76 are of a configuration to slice through thermoplastic bags and draw new material into previously heated material, as well as maintain an even material temperature by constant circulation near the walls of the kettles for heat transfer from the hot oil being circulated through the jackets 20. Each kettle has its own oil jacket. Mixing blade 70 is defined by a first elliptical ring 90 secured perpendicular to a second elliptical ring 92 by support braces 94, 96. An upper bridge 98 is secured to each ring 90, 92 with a cutting knife 100 extending between the rings 90, 92. A center cross bridge 102 is coupled to each ring 90, 92 and the support braces 94, 96. A lower bridge 104 secures the bottom of each ring 90, 92 and support brace 94, 96. The lower bridge 104 includes a first scraper blade 106 placed along one side of the bridge 104 and a second scraper blade 108 placed along the opposite side of the bridge 104. Mixing blade 76 is a mirror image of mixing blade 70; for ease of drawing clarity, the drawing is not complicated with redundant numbering as the blades are interchangeable.

The first kettle 12 and the second kettle 40 are spaced apart by an air gap 82, wherein the first kettle 12 and the second kettle 40 can be operated independently, or at different temperatures, without heat transfer loss. In such an operation, the flow of hot oil may be interrupted to one kettle when a single tank is to be employed.

A cover 50 is positioned over the top 18 of each kettle using access hatches 52, 54 for visual checking of the kettle operation. Funnels 56, 58 allow for ease of inserting thermoplastic material into the kettles. Radar sensors 110, 112 are used to detect the level of material within the kettles 12, 40. In a preferred embodiment, radar sensor 110 is placed within a sensor tube 114 that is fluidly coupled to the kettle 12, wherein movement of the mixing blade 70 will not disturb the actual level of material within the kettle 12. Similarly, radar sensor 112 is placed within a tube 116 that is fluidly coupled to the kettle 40, wherein movement of the mixing blade 76 will not disturb the actual level of material within the kettle 40. The level of material within each sensor tube 114, 116 reflects the actual level of material in each adjoining kettle 12, 40. Outlets 120 and 122 allow material to be drawn from the first kettle 12; outlets 124 and 126 allow material to be drawn from the second kettle 40.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way but may also be configured in ways that are not listed.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures, and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A dual melting kettle comprising: a first kettle having a cylindrical bottom with a first continuous sidewall extending upwardly therefrom to a top, said first sidewall encompassed by a first oil jacket formed adjacent thereto for dispersion of hot oil around said first kettle sidewall; a second kettle having a cylindrical bottom with a second continuous sidewall extending upwardly therefrom to a top, said second sidewall encompassed by a second oil jacket formed adjacent thereto for dispersion of hot oil around said second kettle sidewall; an outer wall formed around said first oil jacket of said first kettle and said second oil jacket of said second kettle forming a main tank and a hose tank; and a cover enclosing the tops of said first and second kettle, said main tank and said hose tank; wherein hot oil is introduced into each said first and second oil jacket for heating material placed in said kettles, said hot oil is expelled from said oil jackets into said main tank, whereby oil is drawn from said main tank for reheating through said hose tank.

2. The dual melting kettle according to claim 1 wherein each said oil jacket includes a baffle for even dispersion of hot oil around each said kettle.

3. The dual melting kettle according to claim 1 wherein each said kettle includes a base with baffles allowing controlled circulation of hot oil, wherein hot oil introduced into each said base heats the bottom of each said kettle and is directed to said oil jacket for heating the sidewall of each said kettle, said hot oil is then expelled from each said jacket into said main tank.

4. The dual melting kettle according to claim 1 wherein said main tank includes an opening fluidly coupled to each said oil jacket, said opening directing oil expelled from each said oil jacket into said main tank.

5. The dual melting kettle according to claim 1 wherein hot oil is withdrawn from said main tank through said hose tank.

6. The dual melting kettle according to claim 5 wherein said hose tank includes an aperture fluidly coupled to said main tank, wherein oil leakage is recovered and passed through said aperture to said main tank.

7. The dual melting kettle according to claim 1 wherein each said kettle includes a sensor tube fluidly coupled thereto, each said sensor tube constructed and arranged to receive a radar sensor for detecting material level.

8. The dual melting kettle according to claim 1 wherein each said kettle includes a mixing blade coupled to a shaft driven by an electric motor mounted to said cover.

9. The dual melting kettle according to claim 8 wherein said mixing blade includes a first elliptical ring secured perpendicular to a second elliptical ring by support braces and an upper bridge having a cutting knife and a lower bridge having a scraper blade.

* * * * *